May 26, 1942.  O. WIRTH  2,284,115
ARMATURE WINDING MACHINE
Filed April 15, 1939  2 Sheets-Sheet 1
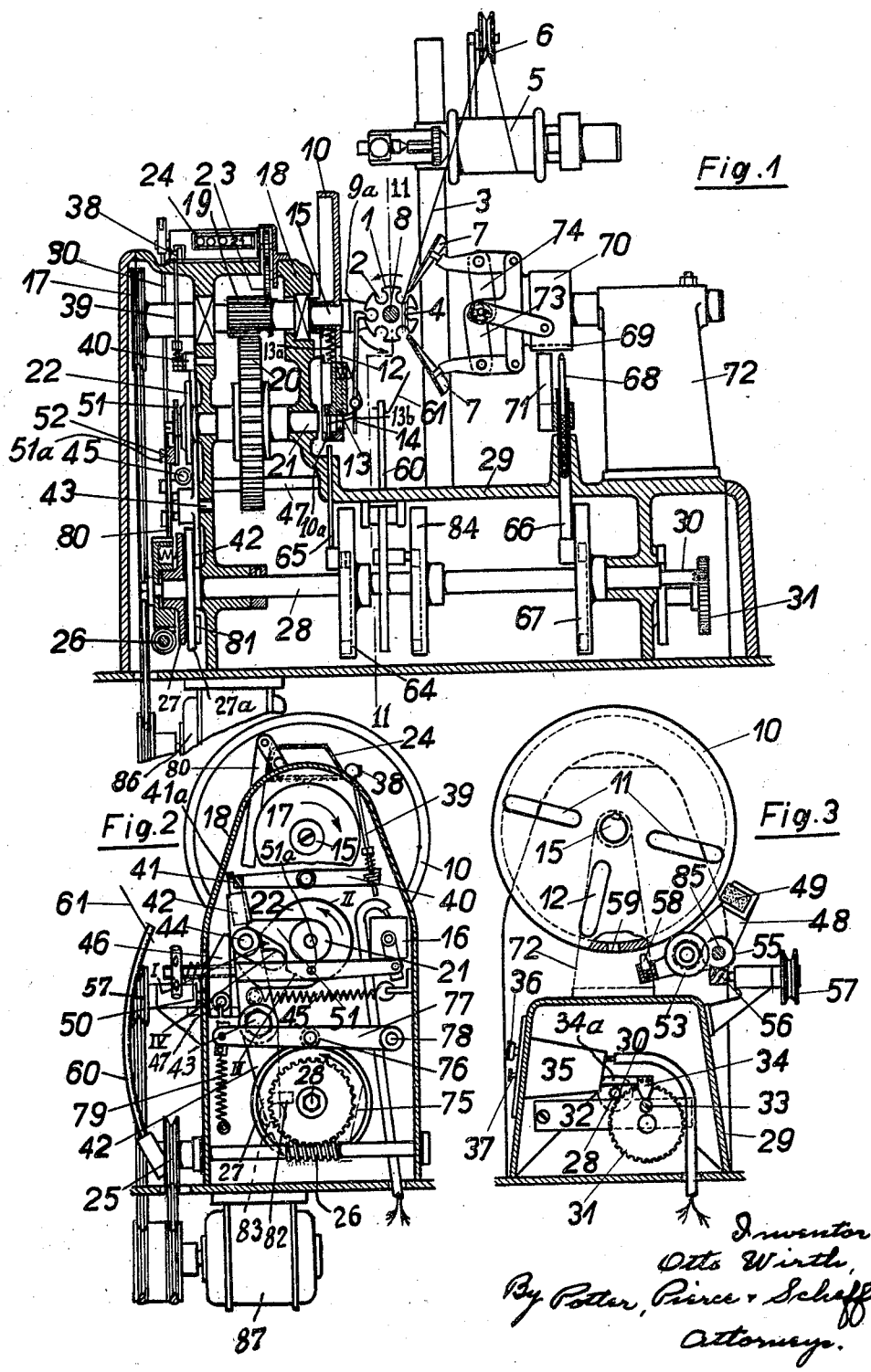
Inventor:
Otto Wirth,
By Potter, Pierce & Scheffler,
Attorneys.

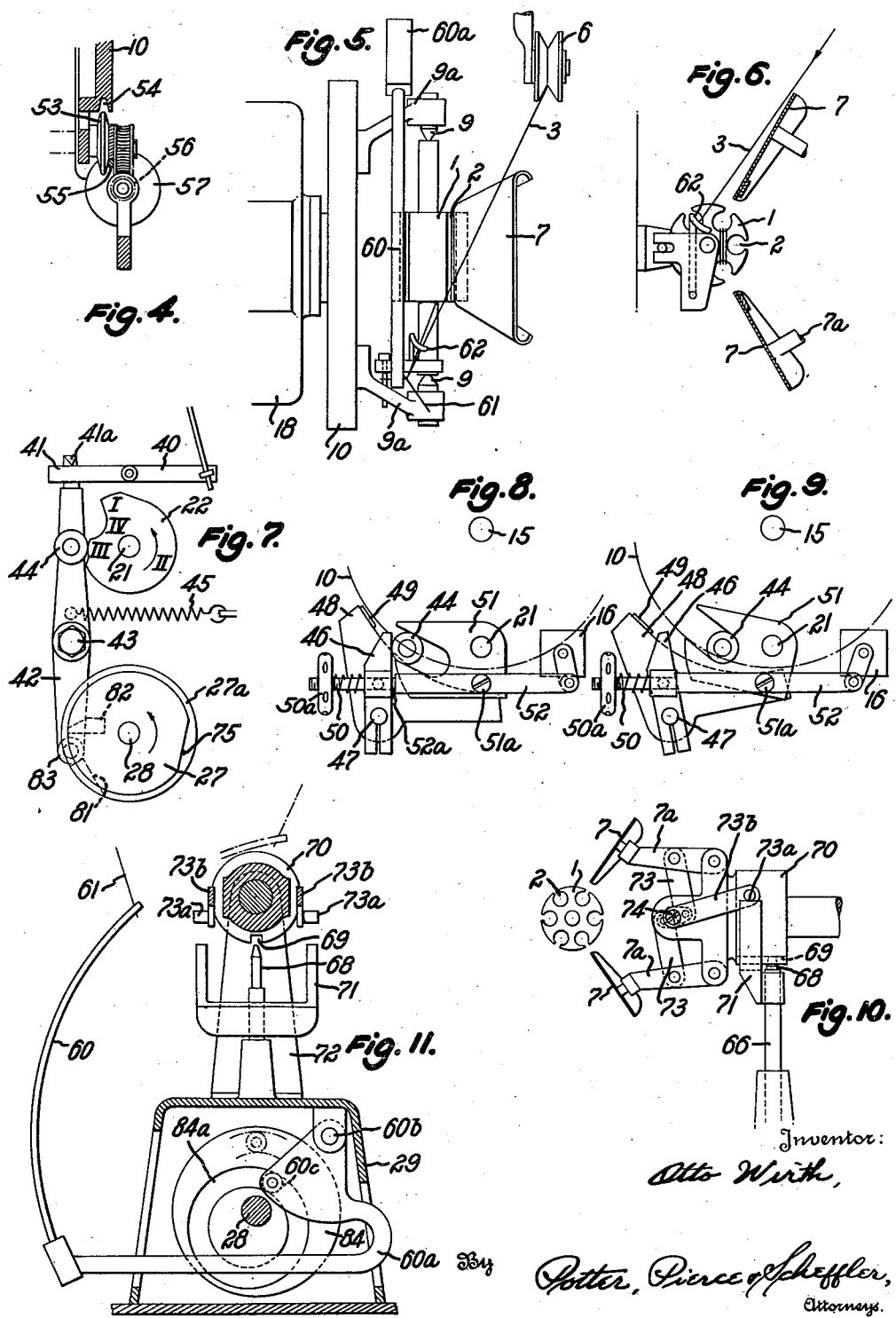

Patented May 26, 1942

2,284,115

UNITED STATES PATENT OFFICE 2,284,115

ARMATURE WINDING MACHINE

Otto Wirth, Zollikon, near Zurich, Switzerland, assignor to Micafil Ltd., Zurich, Switzerland, a joint stock company Application April 15, 1939, Serial No. 268,105
In Switzerland April 21, 1938

15 Claims. (Cl. 242—13)

The winding machines known hitherto for winding slotted armatures with wire coils, particularly for commutator motors, enable the work to be done much more quickly than when the winding is done by hand. With both processes, however, switching over from one pair of slots to the next requires the same amount of time.

According to the invention this time is reduced to a fraction of that required formerly. The invention concerns an armature winding machine which once it has been adjusted does not require any further manipulation except for changing the winding material. It enables the time required to wind small armatures to be reduced to between a sixth and a twentieth of the time previously required and furthermore possesses the advantage that with an exactly calculable output per unit of time it delivers an entirely regular and nicely wound armature.

The armature winding machines known hitherto are equipped with a counter on which the number of turns of the armature coil to be wound can be set as desired and which interrupts the winding process when the set number of turns are reached. The armature winding machine according to the invention also possesses such a counter. The main feature of this counter is that when the desired number of coil turns has been reached it automatically causes the armature to be given an advancing movement such that the slot pair with the just completed coil is replaced by the next empty slot pair and at the same time effects the operations connected with the slot advancing movement.

The accompanying drawings illustrate an example of how the invention is carried into effect, Figure 1 showing a longitudinal section of the armature winding machine, Figure 2 a view of the driving end with cover removed; Figure 3 upper part, shows a partial view of the face-plate to which the armature is fastened and the lower part shows an end view of the inside of the bedplate on the armature side. Figure 4 shows a detail on the faceplate in section, Figure 5 shows a plan view and Figure 6 an elevation of the clamping and wire tensioning device of the armature with the wire guide jaws in the open position. Figures 7, 8 and 9 show details of the stopping control mechanism, Fig. 10 shows details of the operation of the wire guide to the armature, and Fig. 11 is a partial sectional view on the line 11—11 of Fig. 1 showing the wire looping means and wire guide release.

It is required for example to wind six coils 4 of $n$ turns of insulated wire 3 in the six slots 2 of the armature 1 and then to interrupt automatically the winding operation. The wire comes from the feed drum 5 and runs over the guide pulley 6 to the winding machine. Guide jaws 7 of known design are provided which project slightly into both the armature slots to be filled by the coil in question and serve to guide the wire 3. As shown in Figure 5 the armature 1 is rotatable about the shaft 8 supported between centres 9 carried by arms 9a mounted on the face plate 10 and adjustable in the diametrically arranged slits 11 (see Figure 3) in the faceplate 10 being clamped in adjusted position by suitable means, not shown. In a radial slot 12 (see Figure 1) located perpendicularly to the slits 11 is a sliding carriage 13 with a hinged spring-loaded pawl 14 which is adjustable and engages with an armature slot thus causing it to advance and fixing the armature 1 in the position required for the time being. The carriage 13 is yieldingly pressed by a spring 13a to the outer end of the slot 12 and carries a radially disposed rod 13b which normally extends into an opening 10a in the rim of faceplate 10. The faceplate 10 is mounted on the shaft 15 which is carried by bearings located in the machine frame 18 and is driven through a belt pulley 17 by an electric motor 86 which includes in its feeding circuit a switch 16. The gearwheels 19, 20 drive the shaft 21 on which the cam 22 is mounted. The revolutions of the shaft 15 are transmitted by gearing 23 to the counter 24 located on the frame 18.

A second drive separate from that required for the winding process is provided for advancing the slots and for finally stopping the winding process. It is actuated as shown in Figures 1 and 2 by the driving pulley 25 which through worm 26 drives gear 26a and friction coupling member 27 rotatably mounted on the shaft 28 located in the bedplate 29 of the machine. The coupling member 27 is provided with a friction facing and is spring pressed into engagement with a driven friction member 27a rigidly mounted on the shaft 28, thus establishing a frictional slip driving connection to the shaft 28. A two-armed lever 42 pivoted on shaft 43 carries a roller 83 at one end which is engaged by a stop 82 mounted on the coupling member 27a to prevent driving of the shaft 28 by the friction coupling except when the lever 42 is rocked to a position to move the roller 83 out of the path of stop 82.

As shown in Figure 3, a pinion 30 on shaft 28 engages an idler control gear 31, which has a number of teeth equal to the product of the number of teeth on the pinion 30 and the number of slots in the armature 1 to be wound. The gear wheel 31 is replaced by another having the requisite number of teeth, depending on the number of slots in the armature and its mounting bar 32 is made adjustable to accommodate different sized gears to the pinion 30. When the armature, and likewise the gear 31, has made one complete revolution, a stop 33 on the gear 31 engages a cam 34 carried by the control lever 34a of the switch 35 which controls the motor for driving the face plate 10 as well as the motor, not shown, which drives the shaft 28. Thus, when all of the slots are wound, the circuit to the driving motors will be automatically interrupted. The machine is started by pressing the button 36 on the switch 35. By pressing a second button 37 the machine can immediately be stopped at any time.

The remaining parts of the machine not already mentioned are explained in connection with the following description of the method of operation of the machine.

After a gear wheel 31 corresponding to the number of armature slots has been fitted and counter 24 set for the number of turns per armature coil, the beginning of the winding wire 3 is fastened to the armature 1 fixed between centres 9 on the faceplate 10 and the machine set into operation by pressing the button 36 to close the circuit through switch 35. Since the switch 16 which is electrically in series with the switch 35 is already in the circuit closing position the winding motor immediately starts to run and through the pulley 17 sets the winding mechanism into operation. The wire 3 is wound into two slots of the armature 1, the edges of the guide jaws 7 projecting into these.

Shortly before all the turns of the coil have been wound, for example five turns before reaching the set number of turns per coil, the counter 24 releases the stopping and advancing mechanism. This is accomplished by an arm 38 which is raised by the counter mechanism five turns before the number for which the counter is set. The arm 38 is connected by means of the tension rod 39 to one end of the lever 40 on the opposite end of which there is a pawl 41 which normally engages a detent 41a on the upper end of lever 42. When arm 38 is raised, pawl 41 moves out of the path of detent 41a and releases the double-armed lever 42 for rocking motion about the shaft 43. This lever carries a roller 44 which when the lever 42 is freed is pulled by the spring 45 against the cam 22 the contours of which regulate the retardation and stopping of the faceplate 10. The cam 22 which is fast on the shaft 21 revolves once while the faceplate 10 makes five more revolutions.

The movement of the roller 44 of the lever 42 from zone I to zone II on the cam 22 as the latter rotates causes a rocking pressure to be exerted on the crank lever 51 (see Figure 2) pivoted about the shaft 21 and pivotally connected at 51a to a shiftable operating rod 52 for switch 16, thus pulling the rod 52 to the left as viewed in Figs. 2, 8 and 9 which switches off the winding motor by means of the switch 16 operated thereby.

The left end of rod 52 is reduced, forming a shoulder 52a, and the reduced end passes through an upstanding rocker arm 46 mounted fast on a rock shaft 47. A spring 50, confined between the arm 46 and a handwheel 50a threaded on the reduced end of the rod 52, yieldingly urges the rocker arm 46 to the right against the roller 44. A bell crank lever 48, mounted fast on the other end of the rock shaft 47, carries a cork brake block 49 which presses against the rim of the faceplate 10 and causes a braking action when the rocker arm 46 is released upon movement of the roller 44 from position I to position II. The pressure of the spring 50 producing the braking power can be so adjusted by means of the handwheel that after four revolutions the speed of the faceplate 10 is so reduced that the second movement of the roller 44 of lever 42 from zone II to zone III on the cam 22 occurs.

For the sake of clearness arm 46 is not shown in Figure 1 and must be assumed to be mounted on shaft 47.

When moving from zone II to zone III the roller 44 moves the arm 51 upwards still further and the rod 52 pivoted to it is shifted further to the left and pushes the arm 46 backwards against the tension of spring 50, thus rocking the shaft 47 back so that the brake 49 is lifted from the faceplate 10 see Figs. 3 and 9 and at the same time the conical roller 53 situated on the other arm of the bell-crank lever 48 is pressed into a peripheral groove 54 in the faceplate 10 (see Figure 4). Roller 53 is driven separately and at constant speed through a slip coupling 55, worm gearing 56 and pulley 57 by the advancing motor 87. As a result of the frictional effect in the groove the faceplate 10 is rotated until the stop pin 58 engages with the trap hole 59 in the faceplate 10 whereupon this latter remains fixed in a position where the slit 12 is vertical and the slits 11 horizontal.

At the same time lever 42 (see Figs. 2 and 7) has fallen from zone III on cam 22 into the trough IV whereby roller 83 on the lower end of lever 42 is swung away from under stop 82 and releases the locking of the control shaft 28 which is thereupon driven by the friction coupling 27—27a. The movement for advancing the slots then commences and is as follows: by means of the cam 84 on shaft 28, Figs. 1 and 11 the looping device, consisting of an upstanding curved arm 60 carried at one end of a crank arm 60a which is pivotally mounted on pivot shaft 60b. The plate-like end of the crank arm 60a carries a roller 60c which engages an eccentric groove 84a in a disc 84 mounted fast on the shaft 28. A steel wire hook 61 is carried at the upper end of the arm 60. When the disc 84 is rotated by shaft 28, the arm 60 is lifted into the position shown in Figure 5, the steel wire hook 61 seizes the winding wire 3, draws it forward and (see Figure 5) throws it over the hook 62 fixed to the lever 63 carried by the shaft 8 offset from the armature (see Figures 5 and 6), whereupon the looping device 60 returns to the position of rest. The wire loop thus formed serves to connect the armature winding to the commutator.

In the meantime the pawl 14 for turning and advancing the armature (see Figure 1) is moved up out of rest position by means of cam 64 mounted on the shaft 28 and push rod 65 actuated thereby, the latter passing through opening 10a in the rim of faceplate 10 and engaging the end of rod 13b causing carriage 13 to move up towards shaft 15 against the tension of spring 13a. When the pawl 14 is free of the armature 1 guide jaws open and pawl 14 which is now again moving downwards under force of spring 13a engages with the next slot in the armature 1 and rotates it one slot division in the direction indicated by the arrow into the next winding, position. Guide jaws 7 (see Figures 1, 5, 6, 10 and 11) are made to open by means of push rod 66 and cam 67 mounted on shaft 28. The end piece 68 of push rod 66 has a locking action when engaged in the groove 69 of the boss of the guide jaw carrier 70 journalled on the pedestal 72.

The push rod 66 carries a U-shaped pusher member 71, the arms of which straddle the jaw carrier 70 in the upper position of the rod 66 and engage pins 73a carried by jaw operating levers 73b fastened on shaft 74 journalled on the jaw carrier. Links 73, eccentrically pivotally connected to shaft 74 at one end and pivotally connected to jaw arms 7a at the other, serve to spread the jaws or draw them together, upon actuation or release of levers 73b by pusher 71. The yielding end piece of push rod 66 acts to lock the jaw carrier against rotation while the pusher 71 is moving into and out of engagement with arms 73b and the members 64, 67 and 84a are disposed in relation to each other so that the looping of the wire, opening of the jaws, the advancing of the armature and closing of the jaws, occur in the proper timer sequence.

During these movements the counter 24 is brought to the zero position when the flattened peripheral face 75 of the passive half 27a of coupling 27—27a passes roller 76 situated on lever 77 which is hinged about the pivot 78, thus enabling the spring 79 to pull downwards the lever 77 and the tension rod 80 actuating counter 24.

Before the control shaft 28 comes to rest again the wedge 81 located on the passive half 27a of the coupling 27—27a pulls by means of roller 83 the lower arm of lever 42 to the right. The upper limb of lever 42 thus returns to the starting position shown in Figure 2 and is held there by the pawl 41, controlled by the counter 24, until the winding motor is stopped again. The return swing of lever 42 causes through arm 41 and rod 52 the switch 16 to be closed so that the winding motor commences to run again.

In addition to counting the windings the number of slots must also be counted in an analogous manner in order to be able to interrupt the winding process when the armature is finished. For this purpose the pinion 30 at the end of the control shaft 28 (see Figures 1 and 3) engages with the gear wheel 31 which as already mentioned has a number of teeth equal to the product of the number of teeth on the pinion and the number of armature slots. The wheel 31 therefore rotates through the same angle as the armature 1. After a complete revolution the stop 33 lifts the cam 34 of the switch 35 and this stops the entire drive of the machine. The machine is brought to a standstill when the guide jaws 7 are open, the hinged pawl 14 in the upper position and the looping device 60 is above the armature 1, so that the armature can be removed from the machine and replaced by a new one without further manipulation.

It is of course possible to operate the machine with a single driving motor in which case the switch 16 for the winding motor is replaced by a clutch.

We claim:

1. In a machine for winding slotted armatures, an armature holding frame, driving means for revolving said frame, counter mechanism for counting the revolutions of said frame, means under control of said counter mechanism for interrupting the driving of said frame when a desired number of turns have been made, means under control of said counting mechanism for imparting step by step rotation to said armature about its axis after the completion of each winding operation to present an unwound set of slots to be wound and for restarting said driving means after each advancing step of said armature.

2. In a machine for winding slotted armatures, a rotatable armature holding frame, means for mounting an armature in said frame for rotation about its own axis and with its axis at right angles to the axis of rotation of said holding frame, driving means for rotating said holding frame, a counter mechanism for counting the revolutions of said holding frame, rotatably mounted wire guiding jaws adapted to engage in spaced slots of said armature, means for spreading said jaws, means for rotatably advancing said armature step by step about its own axis, control means operating in timed relation with said rotatable armature holding frame and under control of said counter mechanism, and means subject to said control means for interrupting the drive of said rotatable frame, braking and stopping the same, effecting advancing of said armature, and for reestablishing the drive of said rotatable frame, in sequence upon the completion of a selected number of turns of said frame.

3. A machine as defined in claim 2 in which said control means includes a rotatable cam member driven in timed relation with said rotatable frame and an operations control lever biased to follow said cam but releasably retained in a retracted position by means under control of said counter mechanism, said means being released by said counter mechanism when a selected number of turns have been made.

4. A machine as defined in claim 2 in which said control means includes a rotatable cam member driven in timed relation with said rotatable frame and an operations control lever biased to follow said cam but releasably retained in a retracted position by means under control of said counter mechanism, said means being released by said counter mechanism a selected number of turns before the desired number are made to provide a stopping period for said rotatable frame.

5. A machine as defined in claim 2 in which said control means includes a rotatable cam member driven in timed relation with said rotatable frame and an operations control lever biased to follow said cam but releasably retained in a retracted position by means under control of said counter mechanism, said means being released by said counter mechanism a selected number of turns before the desired number are made to provide a stopping period for said rotatable frame, the driving ratio between said cam and said rotatable frame being such that said cam makes one revolution during the stopping period of said frame.

6. A machine as defined in claim 2 in which said control means includes a rotatable cam member driven in timed relation with said rotatable frame and an operations control lever biased to follow said cam but releasably retained in a retracted position by means under control of said counter mechanism, said means being released by said counter mechanism a selected number of turns before the desired number are made to provide a stopping period for said rotatable frame, the driving ratio between said cam and said rotatable frame being such that said cam makes one revolution during the stopping period of said frame and said cam having four zones, the first defining the position occupied by said lever during winding operations, the second defining the position for interrupting the winding drive for finishing the winding and for effecting the braking action, the third defining the position for retarding and stopping the winding frame, and the fourth defining the position for operation of the armature advancing means.

7. A machine as defined in claim 2 in which said armature holding frame includes a face plate constructed as a brake drum with the diameter thereof parallel to the axis of the armature.

8. In a machine for winding slotted armatures, a rotatable face plate having a peripheral braking surface, armature holding frame members carried by said face plate having means for supporting an armature for rotation about its own axis and with its axis parallel to said plate, driving means for rotating said face plate, means for interrupting the drive of said face plate, braking means adapted to engage said braking surface of said plate, stop means adapted to engage said plate, rotatably mounted wire guiding jaws adapted to engage in spaced slots of an armature mounted on said plate, means for spreading said jaws to release said armature, means for rotating said armature step by step about its own axis to advance the slots therein with respect to said jaws, a counter mechanism for counting the revolutions of said face plate, control means operated in timed relation with said rotatable face plate and under control of said counter mechanism for sequentially effecting operation of said drive interrupting means, braking means, stop means, jaw spreading means and armature advancing means upon the completion of a selected number of turns of said frame and means for reestablishing the drive to said face plate upon completion of the sequential operation of said means aforesaid.

9. A machine as defined in claim 8 in which said control means comprises a rotatable cam driven in timed relation with said face plate and an operations control lever biased to follow said cam but releasably held in a retracted position by means under control of said counter mechanism, said cam having four zones, means for applying said braking means when said lever engages one zone of said cam, means for releasing said braking means when said lever engages the next zone of said cam, friction drive means engageable with said face plate in the last mentioned position of said lever for imparting further rotation to said plate, said stop means then engaging said plate to stop the same with the axis of said armature in a horizontal position.

10. A machine as defined in claim 2 in which said control means includes a rotatable cam member driven in timed relation with said rotatable frame and an operations control lever biased to follow said cam and releasably retained in a retracted position by means under control of said counter mechanism, said means being released by said counter mechanism when a selected number of turns have been made, a rotatable shaft for actuating said armature advancing means and means on said lever for preventing rotation of said shaft when said lever is in said retracted position.

11. A machine as defined in claim 2 in which said control means includes a rotatable cam member driven in timed relation with said rotatable frame and an operations control lever biased to follow said cam and releasably retained in a retracted position by means under control of said counter mechanism, said means being released by said counter mechanism when a selected number of turns have been made, a rotatable shaft, a driving connection to said shaft, means on said operations control lever for preventing rotation of said shaft when said lever is in retracted position, a bent lever having a wire engaging hook at one end thereof adapted to engage the winding wire at the completion of a winding operation to form a loop, means actuated from said shaft upon stopping of the winding operation for operating said loop forming lever, locking said rotatable guide jaws against rotation, opening said jaws, actuating said armature advancing means, closing said jaws, releasing the jaw locking means and throwing said operations control lever to retracted position.

12. A machine as defined in claim 2 in which said control means includes a rotatable cam member driven in timed relation with said rotatable frame and an operations control lever biased to follow said cam and releasably retained in a retracted position by means under control of said counter mechanism, said means being released by said counter mechanism when a selected number of turns have been made, a rotatable shaft, means for driving the same, means on said operations control lever for preventing rotation of said shaft when said lever is in retracted position, a bent lever having a wire engaging hook on one end adapted to engage the winding wire at the completion of each coil winding operation to form a loop, a plurality of cam means carried by said rotatable shaft, connections between certain of said cam means and the bent lever, the guide jaw operating means, the armature advancing means respectively to effect operation thereof in sequence upon rotation of said shaft, one of said cam means being adapted to engage said operations control lever to return the same to retracted position and effect resetting of said counter.

13. A machine according to claim 8 in which said face plate is provided with a guide slot extending at right angles to the axis of an armature carried by said frame members and said means for rotating said armature step by step comprises a slidable carriage operating in said guide slot and a pawl carried by said carriage adapted to engage the armature to rotate the same a desired amount on each reciprocation of said carriage.

14. A machine as defined in claim 2 in which said control means includes a rotatable cam member driven in timed relation with said rotatable frame and an operations control lever biased to follow said cam and releasably retained in a retracted position by means under control of said counter mechanism, said means being released by said counter mechanism when a selected number of turns have been made, a rotatable shaft for actuating said armature advancing means, means on said lever for preventing rotation of said shaft when said lever is in said retracted position, a stop switch, and means actuated from said shaft for operating said switch to stop the machine upon completion of the winding operations on the armature.

15. A machine as defined in claim 2 in which said control means includes a rotatable cam member driven in timed relation with said rotatable frame and an operations control lever biased to follow said cam and releasably retained in a retracted position by means under control of said counter mechanism, said means being released by said counter mechanism when a selected number of turns have been made, a rotatable shaft for actuating said armature advancing means, means on said lever for preventing rotation of said shaft when said lever is in said retracted position, a stop switch, a gear driven by said rotatable shaft for operating said stop switch, said gear being interchangeable with others and having a number of teeth calculated in relation to the armature being wound so that said gear is driven through the same angle as said armature.

OTTO WIRTH.